(12) United States Patent
Proll et al.

(10) Patent No.: US 8,277,736 B2
(45) Date of Patent: Oct. 2, 2012

(54) FLUIDIZED BED REACTOR SYSTEM

(75) Inventors: Tobias Proll, Vienna (AT); Philipp Kolbitsch, Vienna (AT); Johannes Bolhar-Nordenkampf, Vienna (AT); Hermann Hofbauer, Vienna (AT)

(73) Assignee: Technische Universitat Wien, Vienna (AT)

( * ) Notice: Subject to any disclaimer, the term of this patent is extended or adjusted under 35 U.S.C. 154(b) by 167 days.

(21) Appl. No.: 12/673,217

(22) PCT Filed: Aug. 14, 2008

(86) PCT No.: PCT/AT2008/000287
§ 371 (c)(1),
(2), (4) Date: Jun. 17, 2010

(87) PCT Pub. No.: WO2009/021258
PCT Pub. Date: Feb. 19, 2009

(65) Prior Publication Data
US 2011/0120560 A1 May 26, 2011

(30) Foreign Application Priority Data

Aug. 14, 2007 (AT) .................. 1272/2007

(51) Int. Cl.
*B01J 8/08* (2006.01)
*F27B 15/00* (2006.01)
*B01J 8/00* (2006.01)
*B01J 8/02* (2006.01)
*B01J 8/04* (2006.01)
*B01J 19/00* (2006.01)
*B01J 35/02* (2006.01)

(52) U.S. Cl. ........ 422/141; 422/129; 422/139; 422/140; 422/142; 422/187; 422/600; 422/630; 422/642; 422/211; 422/213; 422/214

(58) Field of Classification Search .................. 422/129, 422/139–142, 187, 600, 630, 642, 211; 137/1
See application file for complete search history.

(56) References Cited

U.S. PATENT DOCUMENTS 2,665,972 A    1/1954  Lewis et al.
2,963,431 A *  12/1960 Derenk et al. ........... 210/685
(Continued)

FOREIGN PATENT DOCUMENTS
AT           405 937 B     12/1999
(Continued)

OTHER PUBLICATIONS

Machine translation of KR2003-0020114, which is including with the IDS submitted on Feb. 17, 2010 and published Mar. 8, 2003.*

(Continued)

*Primary Examiner* — Walter D Griffin
*Assistant Examiner* — Natasha Young
(74) *Attorney, Agent, or Firm* — Ladas & Parry LLP

(57) ABSTRACT

The present invention relates to a fluidized bed reactor system made up of at least two fluidized bed reactors, comprising at least one main reactor (1) in the form of a circulating fluidized bed and a secondary reactor (2) in the form of a circulating fluidized bed, and also a particle line comprising a particle separator for transporting fluidized bed particles from the main reactor into the secondary reactor, characterized in that, in the lower region of the respective reactor, a line (10) connects the secondary reactor (2) to the main reactor (1) for transporting fluidized bed particles.

18 Claims, 4 Drawing Sheets

U.S. PATENT DOCUMENTS

Figure 1:
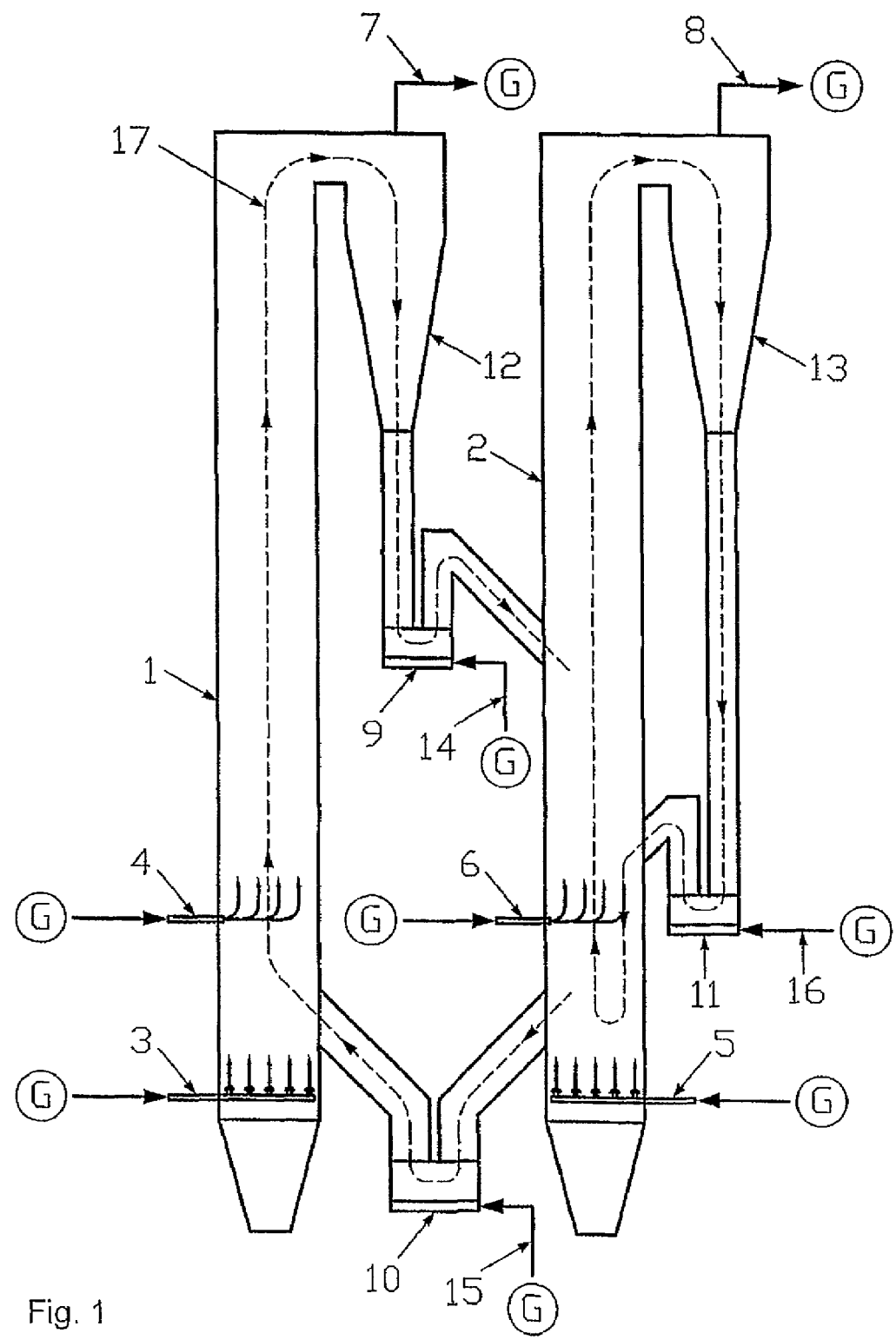

| | | | |
|---|---|---|---|
| 4,076,796 A | | 2/1978 | Reh et al. |
| 4,374,540 A | * | 2/1983 | Massey et al. ................ 165/279 |
| 4,947,804 A | | 8/1990 | Abdulally |
| 6,067,943 A | * | 5/2000 | Morin et al. ................... 122/4 D |
| 6,083,862 A | | 7/2000 | Wheelock |
| 6,110,413 A | * | 8/2000 | Jung et al. ..................... 266/172 |
| 6,143,915 A | | 11/2000 | Zhou et al. |
| 6,276,441 B1 | * | 8/2001 | Ruottu ..................... 165/104.16 |
| 6,290,775 B1 | | 9/2001 | Kohlen et al. |
| 6,418,866 B1 | * | 7/2002 | Shimizu et al. ............... 110/347 |
| 6,887,386 B2 | * | 5/2005 | Bassi et al. .................... 210/661 |

FOREIGN PATENT DOCUMENTS

| | | |
|---|---|---|
| DE | 198 08 439 C1 | 9/1999 |
| EP | 1 637 574 A1 | 3/2006 |
| FR | 2 556 983 A1 | 6/1985 |
| GB | 1 524 345 A | 9/1978 |
| GB | 2 159 432 A | 12/1985 |
| JP | 2000-192056 A | 7/2000 |
| KR | 2000-0042374 * | 7/2000 |
| KR | 2003-0020114 A | 3/2003 |
| WO | 98/30497 A1 | 7/1998 |
| WO | WO 2004/080591 A1 * | 9/2004 |
| WO | 2007/023590 A1 | 3/2007 |

OTHER PUBLICATIONS

Machine translation of KR2000-0042374, which was published Jul. 15, 2000.*

Anders Lyngfelt, et al; "A fluidized-bed combustion process with inherent $CO_2$ separation; application of chemical-looping combustion", Chemical Engineering Science vol. 56, Issue 10, May 2001, pp. 3101-3113.

International Search Report: PCT/AT2008/000287.

* cited by examiner

FLUIDIZED BED REACTOR SYSTEM

The present invention relates to the field of gas-solid reactor systems, especially of circulating fluidized beds.

Gas-solid reactors are used to make solids or parts thereof participate directly in a chemical transformation, either as a reactant, as a catalyst, or as a heat carrier. Gas-solid reactor systems comprising two separate reaction zones allow for separations into two separate gas reaction chambers which are only connected by the stream of solids, whereby the gas streams can be essentially prevented from mixing. Such assemblies have already been successfully used in several fields such as for fast catalytic cracking in the field of mineral oil refining, for the thermochemical transformation of solid fuels into combustible gases (e.g. for the gasification or pyrolysis of coal or biomass), for chemical looping combustion to inherently separate carbon dioxide in the course of carbonaceous fuel combustion (U.S. Pat. No. 2,665,972), for chemical looping reforming to inherently separate carbon dioxide when providing synthesis gas, and for carbonate looping to selectively absorb $CO_2$ from gas streams or from combustion or gasification reactors (EP 1 637 574). The solid circulates from one reaction zone into the other and back into the first one again. Several technical embodiments of such reactors are possible, in which the retention times to be achieved and the fluidodynamic characteristics of the fluidized beds have to be adapted to the problem at hand. Below, the two above-mentioned reaction zones will be referred to as two fluidized bed reactors connected via the stream of circulating solids.

Generally, the term "circulating fluidized bed" is used to refer to a (fast) fluidized bed reactor transporting solids and including a device for separating solids from the outflowing gas stream (such as a centrifugal or gravity separator assembly). An outflowing gas stream and a stream of separated solids are provided. In a common embodiment of a circulating fluidized bed, the solid is carried back into the fluidized bed reactor.

The amount of discharged solids is often regulated by the distribution of the fluidizing gas introduced into the reactor at different sites along the height of the reactor (gas trimming or air staging). Below, a "circulating fluidized bed" will be understood to refer to a fluidized bed in which particles are fluidized by means of a fluid and, after having separated the fluid, at least part of the particles is re-introduced into the same or another fluidized bed. The circulating fluidized bed preferably is a turbulent or fast fluidized bed.

The term "stationary fluidized bed" describes a fluidized bed which forms bubbles, does not transport solids and is disposed in a reactor in which solids have to be withdrawn from the fluidized bed. Above the fluidized bed, there is a gas space (free board) which is almost free of solids.

Generally, fluidized siphons, fluidized connection canals or fluidized slides, and the like are used for sealing off the gas spaces of two fluidized bed reactors against each other. These connecting or sealing elements are preferably fluidized by means of fluids which do not strongly interfere with neither of the two fluidized bed reactors. Water vapour would be an example of such a fluid which can be used for numerous applications.

Reactor systems in which a stationary fluidized bed is involved in the re-introduction of the solids in a common circulating fluidized bed are already known (AT 405937 B; JP 2000/192056; Lyngfelt et al., Chemical Engineering Science 56 (2001), 3101-3113; EP 1,637,574). Lyngfelt et al., for example, describe a system consisting of an air reactor and a fuel reactor, between which a metal/metal oxide is exchanged in cycles. In the air reactor, a metal oxide is formed by the oxidation of the bed material, said metal oxide being re-converted into its reduced form by the oxidation of the fuel (such as a gaseous hydrocarbon) in the fuel reactor. In the overall reaction, fuel is burned by means of air. The exhaust gases resulting from this reaction do not mix due to the separation of the two gas reactors. Thus, on the one hand, nitrogen containing residual oxygen (air reactor) and, on the other hand, a $CO_2$-water mixture (fuel reactor) are obtained separately. Due to the different gas flow rates, a circulating fluidized bed is used in the air reactor and a stationary fluidized bed is used in the fuel reactor.

Such assemblies, in which a stationary fluidized bed is involved in the re-introduction of the solids in a common circulating fluidized bed, allow for a robust operation without excessively straining the particles, as the main part of the solid is located in the stationary fluidized bed and the particles pass the cyclone just once in the course of one complete cycle. Due to the implementation of one of the two reactors as a stationary fluidized bed, the use of such systems is, however, limited in the case of high-capacity facilities, because the reactor cross-section required in the area of the stationary fluidized bed has to be very large. If the procedure aims at largely converting the fluidizing gas in contact with the solid, the stationary fluidized bed has the additional disadvantage that there is only a poor contact between the gas and the solid in the bubble phase and that the solid concentration is only low in the free board above the stationary fluidized bed. Thus, there is a risk of leakage of the unreacted charging or fluidizing gas.

DE 19 808 439 C1 (U.S. Pat. No. 6,290,775) describes the connection of two stationary fluidized beds via a leaping weir for the solid particles, said connected stationary fluidized beds including a cover in the gas space in order to prevent the gases in the gas spaces from mixing.

Reactor systems consisting of two or more connected circulating fluidized beds are known as well. The aim of some of these applications consists in the treatment of the solid, said treatment being implemented by means of a stage principle, the solid passing through one reactor after the other without a recirculation of the solid to the first reactor (WO 98/30497, KR 2003 0020114). In other known applications, solid loops are implemented in the form of two connected circulating fluidized bed systems. In these systems, the discharged solid, which subsequently is separated from the gas stream, is carried into the other fast fluidized bed reactor (U.S. Pat. No. 6,083,862 B1) or is carried via appropriate devices for dividing the solid streams separated in the centrifugal or gravity separator proportionally to the same or the other fast fluidized bed reactor. It is possible to carry material to the other reactor either after a particle separator or via a particle discharge at the bottom of the reactor by means of a pneumatic transport device (GB 1 524 345). Such systems do not present the scaling problem described for assemblies using a stationary fluidized bed, and the contact between gas and solid is established along the whole reactor height in fast fluidized reactors. The known use of two fast fluidized bed reactors requires a regulating control of the location of the solid within the system, and, additionally, the solid has to be discharged and separated at least two times in the course of one cycle, putting the particles under a higher mechanical strain.

The present invention aims at overcoming the disadvantages of known systems and especially at providing a fluidized bed reactor system consisting of at least two circulating fluidized bed reactors in which the solid transport of the individual reactors may be adjusted independently. Thus, the contact between gas and solid may be optimized in all the fluidized bed reactors involved and, at the same time, the procedure may be optimized to become a robust operation without excessively straining the particles and still has a high overall solid cycling rate. These advantages have positive effects, especially when scaling up the above-mentioned processes, which, as is known, are implemented in the form of combinations of a circulating fluidized bed and a stationary fluidized bed, because the stationary fluidized bed is not required and may be replaced by a further circulating fluidized bed.

Thus, the present invention relates to a fluidized bed reactor system consisting of at least two fluidized bed reactors comprising at least one main reactor in the form of a circulating fluidized bed and a secondary reactor in the form of a circulating fluidized bed. The reactor system of the present invention further comprises a particle line for transporting fluidized bed particles from the main reactor to the secondary reactor, said particle line comprising a particle separator (such as a gravity or centrifugal separator). The present invention is characterized in that the reactor system of the present invention has a line for transporting fluidized bed particles connecting the secondary reactor with the main reactor in their lower areas. The line from the secondary reactor to the main reactor especially connects the lower quarters, thirds, or halves of these reactors, preferably below the filling level of the solid beds in the reactor system after stopping the fluidization. In specific embodiments of the system of the present invention, the line connects the bottoms of the two reactors. "Upper" and "lower" are to be understood in relation to gravity or the flow direction of the inflowing fluid (or reaction or carrier fluid/gas), as the fluid flow acts against gravity in keeping the particles in the fluidized bed. In specific embodiments, additional mechanical devices (such as flaps or sliders) are provided in order to affect the flow resistance in the particle line for transporting fluidized bed particles from the main reactor to the secondary reactor.

Generally, the present invention is a reactor system consisting of at least two communicating fast fluidized beds in two reactors with a novel way of directing the circulating solid stream, which leads to an optimized turnover in chemical reactions due to the high amount of particles and the long gas dwelling time in the reaction zones. At the same time, the system provides a good regulation of the particle distribution within the system.

Further advantages of the system of the present invention are, for example, that the fluidization of the second reactor (secondary reactor) or optional further reactors may be optimally adapted to the requirements of the reaction without affecting the overall solid circulation; that the localization of the solid in the system is stable and does not have to be constantly monitored and regulated; that the overall solid circulation may be simply adjusted by trimming the fluidization fluid or gas through the height of the particle-transporting reactor (main reactor); and that the design of those reactors that are not responsible for the overall particle transport (i.e. the secondary reactor and optional further reactors) may be optimized in order to provide for a low mechanical strain of the particles.

The present invention especially relates to a system of reactors with fluidized beds, wherein the main reactor and the secondary reactor are in direct hydraulic contact with each other, said contact being established via a fluidized connection (which is fluidized with an inert gas, for example, for sealing off the gas spaces of the two reactors, and may, for example, be designed in the form of a siphon, a connection slide, or a connection conduit), which means that the fluidized beds or the filling levels, respectively, of the main reactor and the secondary reactor may be balanced. The particles preferably are solid particles and/or the introduced fluid preferably is a gas, especially one that is suited for fluidizing the particles in a fluidized bed (for example, a turbulent or fast fluidized bed).

Alternatively, the particles from the secondary reactor may be re-introduced into the main reactor or, when an appropriate device for dividing the particle stream is used, partly into the secondary reactor and partly into the main reactor. Thus, a preferred embodiment relates to a system according to the present invention which is characterized in that the particle line, which serves to transport fluidized bed particles from the main reactor to the secondary reactor and comprises a particle separator, also directs a part of the particle stream directly back to the main reactor, using a suitable device for dividing the particle stream. In preferred embodiments, the secondary reactor has a particle return loop which directs the particles of the fluidized bed of the secondary reactor back to any one of the fluidized bed reactors, or, when an appropriate device for dividing the particle stream is used, back to different fluidized bed reactors.

The particle return loop of the secondary reactor comprises channels or lines which are provided independently of the reactor, for example after particle separators (such as centrifugal or gravity separators), and lead back into the reactor (main or secondary reactor). Preferably, the connecting line in the lower area of the reactors for transporting fluidized bed particles from the secondary reactor to the main reactor is provided independently from the particle return loop of the secondary reactor.

Thus, the overall circulating particle stream is discharged from the main reactor, separated from the fluid stream, and directed to the secondary reactor via an optional sealing device, the particles being directed from the secondary reactor back into the main reactor via the line in the lower areas of the reactors, while the particles which may be discharged from the secondary reactor are directed, after having been separated from the fluid stream, back into the secondary reactor (or entirely or partly into the main reactor). It is also possible that part of the particle stream from the main reactor to the secondary reactor is directed back into the main reactor via an appropriate device for dividing the particle stream.

One or more fluidized bed reactors which are similar to the secondary reactor may be added to the reactor system, said one or more fluidized bed reactors being in hydraulic contact with the main and/or the secondary reactor via an appropriately implemented connection, and, after having been separated from the main stream, the circulating particles from the main reactor may be introduced either into one of the secondary reactors or, by means of an appropriate device for dividing the particle stream, into different secondary reactors. It is also possible to provide for several secondary reactors which are connected in parallel by means of stream-dividing and stream-collecting connecting elements.

Alternatively or additionally, one or more further fluidized bed reactors may be connected to the system consisting of main and secondary reactors, so that the secondary reactor functions as a main reactor for this further reactor/these further reactors. This means that the return loop of the (primary) secondary reactor leads into a further secondary reactor. From the additional secondary reactor(s), the particles are recycled into the previous secondary reactor, into another secondary reactor, or into the main reactor, for example via a connecting line in the lower area of the relevant reactors, as herein described for the main reactor and the (primary) secondary reactor. In specific embodiments, additional mechanical devices (such as flaps or sliders) are provided for affecting the flow resistance in the particle line for transporting fluidized bed particles from the additional secondary reactor to the primary secondary reactor or between the additional secondary reactor and the main reactor. According to this embodiment, each secondary reactor comprises a particle line which directs all the particles of the fluidized bed of the secondary reactor or at least part of them into a further secondary reactor.

In a specific embodiment, the further secondary reactors may be connected to the line from the main reactor to the primary secondary reactor (which is connected to the main reactor in its lower area) between those two reactors. According to this example, the above-described particle line leads from the main reactor via one or more further secondary reactors to the (primary) secondary reactor.

In such systems with additional secondary reactors, there is either a particle line from at least one secondary reactor to a further secondary reactor or the particle line from the main reactor to the secondary reactor additionally leads at least partially to (a) further secondary reactor(s), combinations thereof being possible as well. Moreover, the particle return loop of the secondary reactor or the particle line from the main reactor to the secondary reactor may comprise a particle stream divider which preferably comprises a gas sealing element, particularly preferred a siphon, particularly preferred with inert gas fluidization taking place therein.

In the main reactor and the secondary reactor(s), (carrier) fluid inlets, preferably gas inlets (such as nozzles, gas lances, or the like), for forming the fluidized beds are provided. Due to the coupling of the reactors according to the present invention, the gas flow rates into the two reactors may be selected independently and adapted optimally to the technical requirements of the reaction. Particularly, the particle circulation in the secondary reactor may be adjusted independently of the main particle cycle (from the main reactor via the secondary reactor(s) back to the main reactor), as it is possible to recycle particles into the main reactor independently of the particle circulation in the secondary reactors via the line in the lower area of the reactors. As the fluidized beds strive to have the same "imaginary filling levels" (i.e. the same gas pressure losses as determined by the particle content), an aggregation of particles in one of the two reactors can be avoided.

In the main reactor and in the secondary reactor(s), fluid inlets, preferably gas inlets, for forming the fluidized beds are provided. It is particularly preferred that the main reactor and/or the secondary reactor have several fluid inlets, preferably gas inlets, which are staggered or set off from one another along the height of the respective reactor or are disposed in tiers in several planes along the reactor height. A fluid, preferably gas, enters into the reactors through these inlets, for example as a reactant or an inert gas, for transporting the particles, but mainly for forming the fluidized beds.

The particle return loop of the secondary reactor preferably leads into said secondary reactor below the inlet of the particle line for transporting fluidized bed particles from the main reactor into the secondary reactor. It is particularly preferred that the particle line for transporting fluidized bed particles from the main reactor into the secondary reactor enters into the secondary reactor above the line for transporting fluidized bed particles from the secondary reactor into the main reactor. It is especially preferred that the line for transporting fluidized bed particles from the secondary reactor enters into the main reactor in the lower area of the main reactor, preferably in its lower half, lower third, or lower quarter. Concerning the fluid inlets, it is preferred that the line for transporting fluidized bed particles from the secondary reactor to the main reactor enters into the main reactor as close to the bottom as possible, but above the lowest fluid inlet. In specific embodiments, this lowest fluid inlet of the main reactor may be replaced by carrying out fluidization in the area of the connecting line. Similarly, this holds true for the secondary reactor: It is preferred that the line for transporting fluidized bed particles from the secondary reactor to the main reactor emerges from the lower half, preferably the lower third or lower quarter, of the secondary reactor. Concerning the fluid inlets, it is preferred that the line for transporting fluidized bed particles from the secondary reactor into the main reactor emerges from the secondary reactor as close to the bottom as possible, but above the lowest fluid inlet. In specific embodiments, this lowest fluid inlet in the secondary reactor may be replaced by carrying out fluidization in the area of the connecting line.

The particle return loop of the secondary reactor may independently comprise a particle separator (such as a gravity or centrifugal separator), preferably a cyclone. The particle line from the main reactor to the secondary reactor may also comprise a particle separator (such as a gravity or centrifugal separator), preferably a cyclone.

In a specific embodiment, the line for transporting fluidized bed particles from the secondary reactor to the main reactor additionally comprises a gas sealing element, preferably a siphon. Analogously, the particle line from the main reactor to the secondary reactor and the particle return loop of the secondary reactor may comprise a gas sealing element, preferably a siphon. The gas sealing elements may independently comprise an inert gas inlet, especially for fluidizing the particles or for blocking the reactor gas flow by means of the sealing element. Generally, the gas barrier elements or sealing elements serve the purpose of preventing any gas flow or gas exchange between the reactors.

Moreover, it is preferred that particle fluidization using an inert gas for maintaining the particle stream at least partially fluidized takes place in the line for transporting fluidized bed particles from the secondary reactor into the main reactor. Especially if the particles are directed upwards into the main reactor, the particles may be kept moving this way. Alternatively or additionally, the particle stream may be directed (at least partially) over a slide or a downward channel, for example. It is also preferred that particle fluidization using an inert gas takes place in the particle line from the main reactor to the secondary reactor and/or in the particle return loop of the secondary reactor. Here, an inert gas is to be understood as a gas which does not negatively affect the processes in either of the two reactors. In the case of thermochemical conversion procedures such as chemical looping processes, water vapour would be an example for such a gas.

In preferred embodiments with several reactors, the particle return loop of a secondary reactor comprises a particle stream divider and/or the particle return loop of the main reactor comprises a particle stream divider, said divider preferably comprising a gas sealing element, particularly preferred a siphon, particularly preferred with an inert gas inlet. By means of one or more particle stream dividers, it is possible to connect further reactors to the system, either in series or in parallel.

An additional fluidized bed reactor such as a stationary fluidized bed reactor, which preferably comprises a heat exchanger ("fluidized bed heat exchanger"), may be introduced into the particle stream, for example in the area of the particle stream from the main reactor to the secondary reactor, whereby only a part of the particle stream may be directed through this additional fluidized bed reactor, optionally by using an appropriate device for dividing the particle stream. In specific embodiments, the particle return loop from the main reactor to the secondary reactor and/or the line for transporting fluidized bed particles from the secondary reactor into the main reactor and/or the particle line for transporting fluidized bed particles from the secondary reactor into the main reactor thus comprise(s) a heat exchanger, preferably a stationary fluidized bed. By using a device for dividing the particle stream, such additional fluidized bed reactors along the particle stream may be passed only by a part of the particle stream present at the respective location. The remainder of the particle stream bypasses the fluidized bed heat exchanger or is directed to the main reactor or one of the secondary reactors via a different path.

The present invention further relates to a method for transporting particles through a fluidized bed reactor system, wherein particles, especially solid particles, are directed through a fluidized bed in the main reactor and through a fluidized bed in the secondary reactor and wherein at least part of them is transported from the secondary reactor via a line in the lower areas of the respective reactors into the main reactor. The amount of fluid flowing in at the fluid inlets of the secondary reactor is preferably selected independently of the amount of fluid flowing in at the fluid inlets of the main reactor. The overall particle stream from the main reactor to the secondary reactor and back to the main reactor is strongly affected by the amount of fluid flowing in at the fluid inlets of the main reactor, i.e. by the particle transport in the main reactor.

On the other hand, the overall particle stream is largely independent of the amount of fluid flowing in at the fluid inlets of the secondary reactor. This behaviour of the system of the present invention is confirmed by experimental results.

In the method according to the present invention, the amount of the particles discharged from the circulating fluidized bed reactors (main and secondary reactors) may increase with an increasing overall amount of fluid flowing in at the respective fluid inlets. The method of the present invention is preferably characterized in that the amounts of particles discharged from the main reactor and the secondary reactor(s) are increased when the fluid mass flows are shifted towards the lower fluid inlets and are reduced when the fluid mass flows are shifted towards the upper fluid inlets.

In the method according to the present invention, the amounts of particles discharged from the circulating fluidized bed reactors (main and secondary reactors) may increase with an increasing amount of particles in the fluidized bed system. Moreover, the method is preferably characterized in that the amounts of particles discharged from the circulating fluidized bed reactors (main and secondary reactors) increase with a decrease of the grain size of the particles in the fluidized bed system.

Due to reasons of hydrostatics, the application of a pressure difference between the gas outlets of two fluidized bed reactors which are connected in their lower areas by a connecting line for transporting fluidized bed particles (such as a main reactor and a secondary reactor) may cause a shift of particles towards the reactor to which the lower pressure is applied. This leads to a decrease of the amount of particles discharged from the reactor to which the lower pressure is applied, while, at the same time, the amount of particles discharged from the reactor to which the higher pressure is applied increases. Such additionally applied pressure differences between the gas outlets of the fluidized bed reactors are preferably of the same order as the pressure losses caused by the fluidized bed particles in the involved reactors, and are particularly preferred lower than the pressure losses caused by the fluidized bed particles in the involved reactors.

The method according to the present invention makes it possible to affect the overall particle circulation between the main reactor and the secondary reactor by means of a change of the flow resistance in the line for transporting fluidized bed systems from the secondary reactor into the main reactor. An increase of the flow resistance leads to a reduction of the circulation of particles. Similarly, this holds true for the particle circulation from the secondary reactor to a further secondary reactor, if said further secondary reactor is present in a specific embodiment of the fluidized bed system. In a particle line or in a gas sealing element (such as a siphon) provided in a particle line, the flow resistance is preferably influenced by a change of the fluidization state of said particle line or the gas sealing element. In specific embodiments of the system according to the present invention, additional mechanical devices (such as flaps or sliders) are provided for affecting the flow resistance in the particle lines.

Specific fields of application for the described reactor system are the fields of chemical technology and energy technology. The reactor system is particularly suited for applications in which a high overall particle or solid circulation is to be combined with an intensive contact between gas and particles in more than one reaction zone.

As the overall particle circulation is independent of the fluidization condition of the secondary reactor, it is possible to optimize the gas conversion in the secondary reactor.

This is especially advantageous for the chemical looping method for inherent quantitative carbon separation in the course of the combustion of carbonaceous fuels, for example. This method, which is subject of international discussions, is considered as key technology for the separation of carbon in combustion processes. In this method, metal oxides are used as circulating solid and allow for the transport of oxygen from one reactor (air reactor) into the other reactor (fuel reactor) by means of repeated reduction and oxidation. The advantage of the method is that the exhaust gas of the fuel reactor only consists of $CO_2$ and $H_2O$ if the level of gas conversion is sufficiently high, the $CO_2$ being present in a pure form after the condensation of the water. Compared to the direct combustion of the fuel, no additional energy input is necessary. The present invention may be directly used for this method, for plants of any capacity, but especially for large-scale processes in power plants. The present invention allows for a robust operation of the plant with an optimized contact between gas and particles in the two reactors.

By using the system of the present invention, the performance in thermochemical conversion procedures (such as pyrolysis and gasification) of solid fuels (such as coal and biomass) may be improved compared to known procedures. A more intensive contact of catalytically active fluidized bed particles with the gas in the gas production reactor (which corresponds to the secondary reactor and, in most cases, is fluidized using water vapour and/or recycled product gas) makes it possible to largely decompose higher carbohydrates (such as tars), which are mostly undesired in subsequent processes. At the same time, the desired energy input from the combustion reactor (which corresponds to the main reactor and, in most cases, is fluidized by means of air) may be adjusted independently of the flow conditions in the gas production reactor by adjusting the amount of gas flowing in at the gas inlets of the combustion reactor and the amount of circulating particles flowing from the combustion reactor to the gas production reactor depending on the inflowing amount of gas.

The present invention may further be applied in the field of the selective absorption of components out of gas streams using a reactive solid (such as carbonate looping for the separation of $CO_2$ from combustion exhaust gases). In this case, a good contact between gas and particles and the possibility of adjusting the overall circulating particle stream are important as well.

The present invention will now be explained in more detail referring to the drawings and working examples below, without being specifically limited thereto.

DRAWINGS

FIG. 1 shows a schematic diagram of an embodiment of the fluidized bed reactor system with two reactors. A particle stream (17) is transported from a main reactor (1) (such as a solid transport reactor) into a secondary reactor (2) using a fluidization medium (a reactive or inert gas). Solid particles are fluidized in a fluidized bed in the main reactor by means of a gas flowing in through the gas inlets (3, 4), which may, for example, be realized in the form of valve trays, gas lances, or the like, and are continuously discharged from the reactor. In a cyclone (12), the particles are separated from the gas which is evacuated via the gas outlet (7). The separated particles are transported to a gastight sealing element (siphon) (9) with an inert gas inlet (14). After that, the particles are transported into the secondary reactor (2), where they are again fluidized in a fluidized bed by means of a gas stream (staggered gas inlets 5 and 6 which may, for example, be realized in the form of valve trays, gas lances, or the like). Analogously to the main reactor, the particles transported by the gas stream in the secondary reactor are transported into a solid separator (such as a cyclone) (13) at the upper end of the secondary reactor where the gas of the secondary reactor is separated from the particle stream and discharged via the gas outlet (8). The particles are transported back into the secondary reactor via a sealing element (11) (optional) having an inert gas inlet (16). In its lower area, the secondary reactor additionally has an outlet to a line for further transporting the particles into the main reactor. The line additionally comprises a sealing element (10) which serves for sealing off the gas spaces in the main and secondary reactors by fluidizing the particles using an inert gas (15). In the present embodiment, this line is disposed between the staggered gas inlets of the secondary reactor (5, 6) and the main reactor (3, 4). In the main reactor or the secondary reactor, the particle stream inlets preferably are disposed in the lower area, for example below the imaginary surface of the particle filling level when turning off the fluidization, or in the lower quarter, the lower third, or the lower half of the main or secondary reactor.

Figure 2:
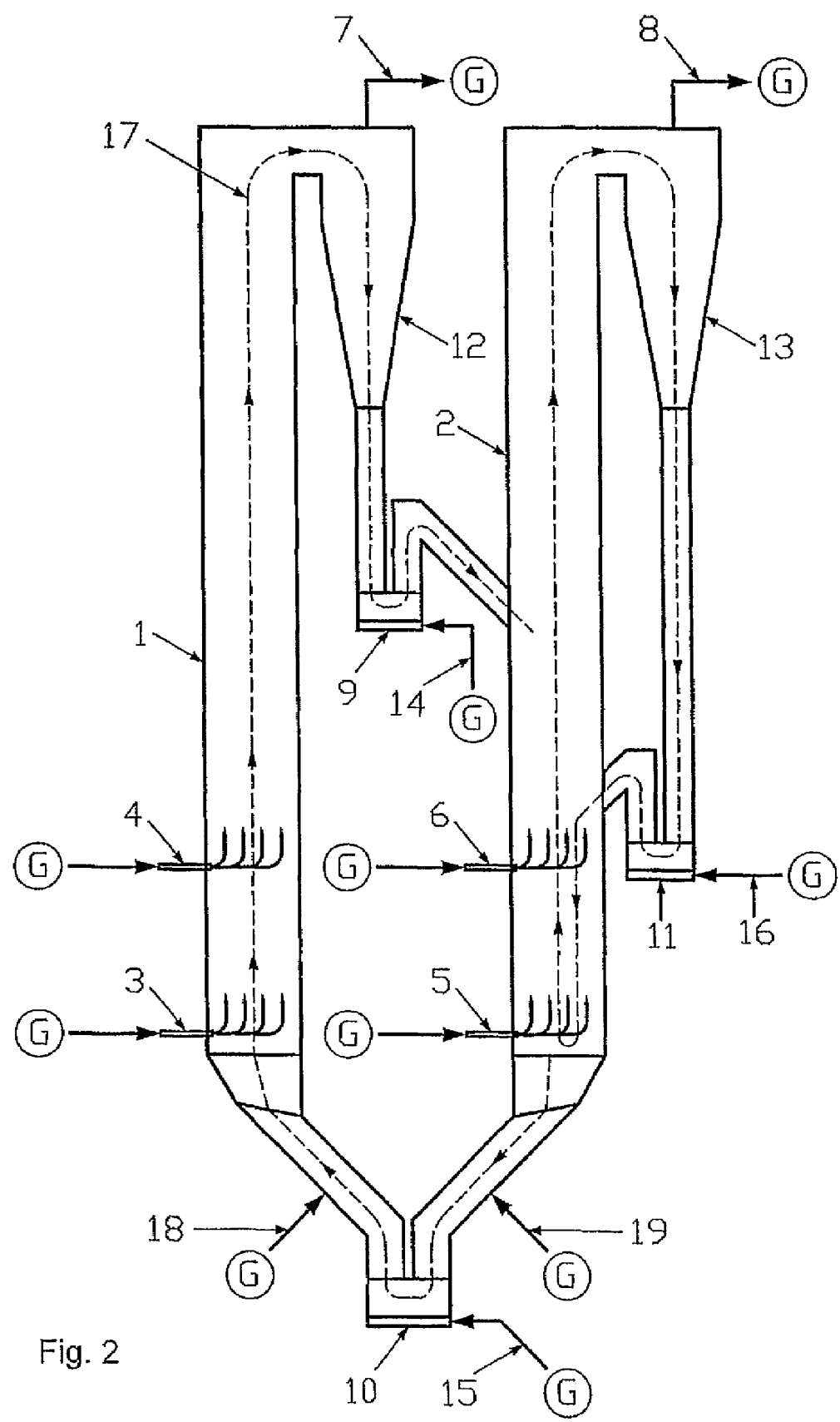

FIG. 2 shows a schematic diagram of an embodiment of the fluidized bed reactor system with two reactors for small-scale plants. This embodiment is constructed analogously to FIG. 1, with the exception that the connecting line between the secondary reactor and the main reactor is disposed below the gas inlets of the secondary reactor (5, 6) and below the gas inlets of the main reactor (3, 4). Additionally, the particle transport may be promoted by gas inlets (18, 19) for supporting the fluidization.

Figure 3:
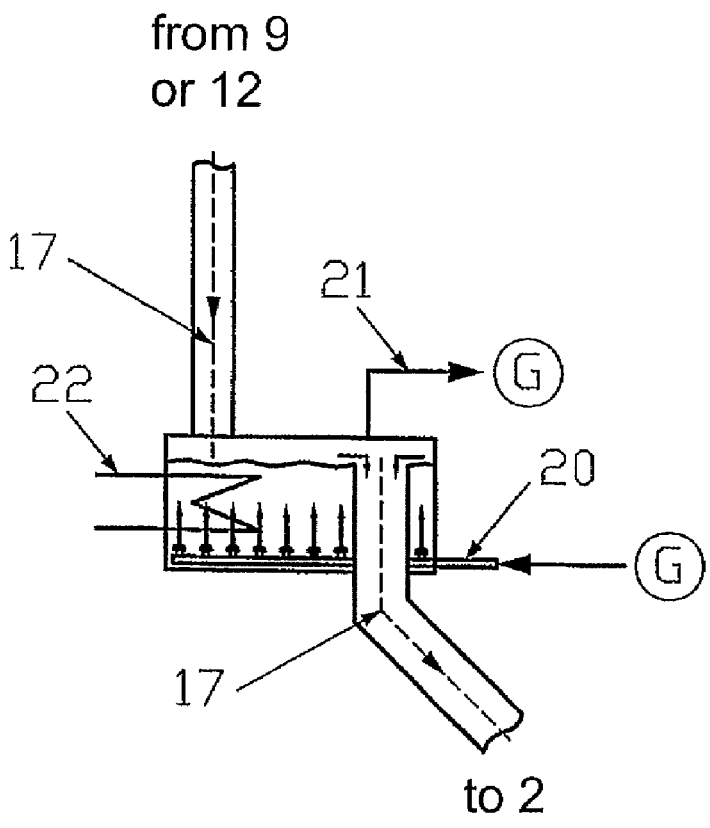

FIG. 3 shows a diagram of connections of an additional stationary fluidized bed element which comprises a heat exchanger and is disposed after a particle separator (such as a cyclone) or before, after, or within a gas sealing element (such as a siphon). The fluidized particle stream (17) is transported from the particle separator (a cyclone, for example) (12) or the gas sealing element (a siphon, for example) (9) into a stationary area in which the fluidized solid contacts heat exchange surfaces (22). A fluidization or inert gas flows in upwards via the gas inlet (20), said fluidization or inert gas being discharged via the gas outlet (21) after having been in contact with the particles, during which contact chemical reactions may take place.

Figure 4:
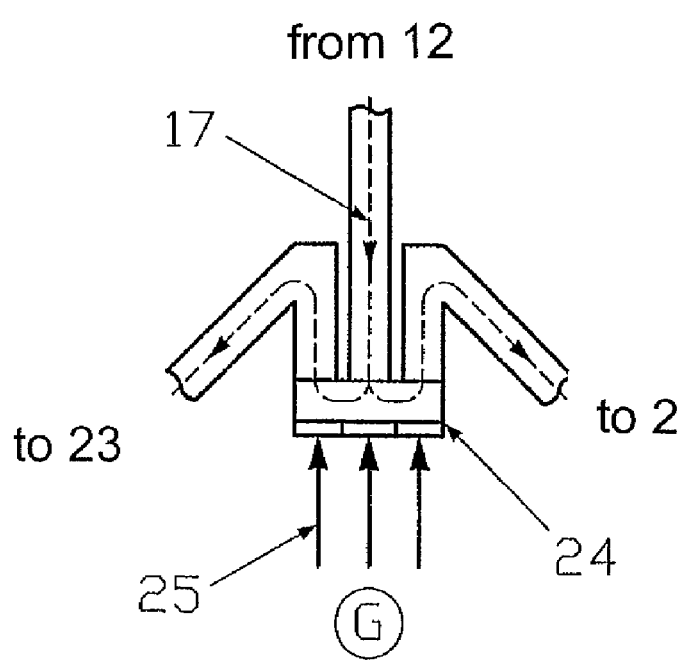

FIG. 4 shows a diagram of connections of a particle stream divider, for example for several secondary reactors. The fluidized particle stream (17) is, for example, trans-ported from the particle separator (12) of the main reactor (1) into a particle stream divider (24) such as a divided siphon and is transported from the divider to two reactors (2, 23) by means of a fluidization medium (such as an inert gas) (25). A secondary reactor (23) (not shown) may be implemented in the same way as the secondary reactor (2), but may also be an additional stationary fluidized bed element (such as a heat exchanger).

Figure 5:
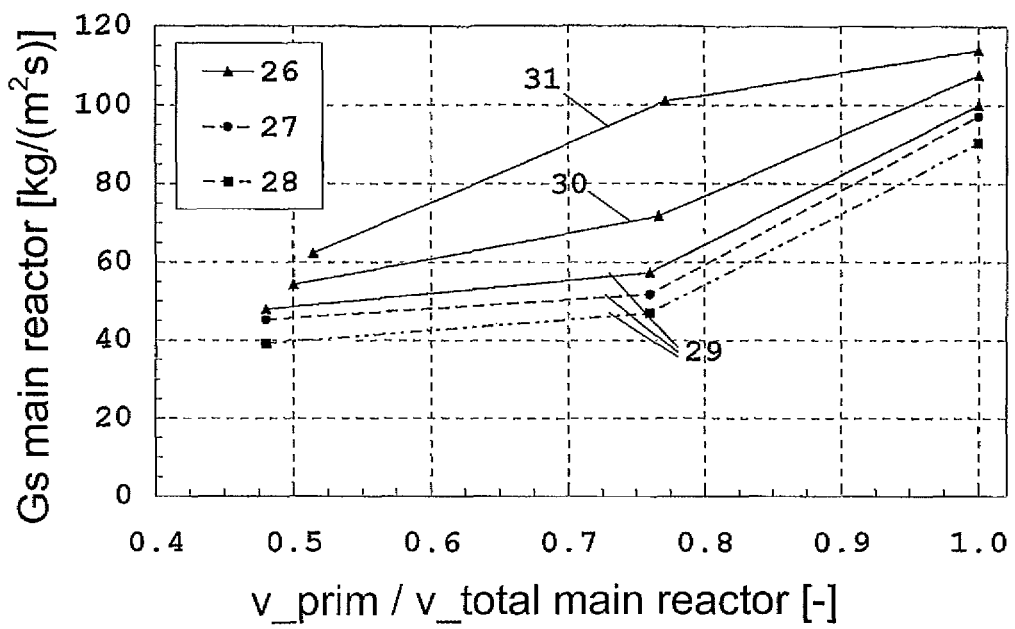

FIG. 5 shows the specific particle transport rate (Gs in kg/(m$^2$s)) of the main reactor as a function of the distribution of the fluidization medium to the lower (3) and upper (4) fluid inlets of the main reactor of a hydrodynamic model of the fluidized bed system according to the present invention as shown in FIG. 2, in which model air is used as the fluidization medium. The parameters shown in the diagram include different overall amounts of fluidization medium flowing into the main reactor (25 Nm$^3$/h (29), 30 Nm$^3$/h (30), and 35 Nm$^3$/h (31)), on the one hand, and different amounts of fluidization medium flowing into the secondary reactor (10 Nm$^3$/h (26), 15 Nm$^3$/h (27), and 20 Nm$^3$/h (28)). In this specific case, the secondary reactor is only fluidized via the lower fluid inlet (5). The particle transport in the main reactor clearly depends on the overall amount of fluidization medium flowing into the main reactor and on the distribution of the fluidization medium to the lower (3) and the upper (4) fluid inlets of the main reactor. It is also clearly shown that the particle transport in the main reactor increases when the overall amount of fluidization medium flowing into the main reactor is increased. Furthermore, it can be seen that an increase of the amount of fluidization medium flowing in through the lower fluid inlet (3) also leads to a significant increase of the particle transport if the overall amount of the inflowing fluidization medium remains constant. The fluidization of the secondary reactor affects the particle transport in the main reactor only to a slight extent. This influence may be explained by the fact that an increased fluidization in the secondary reactor leads to a higher pressure loss in the secondary reactor and thus promotes the movement of solid particles through the connecting line from the secondary reactor to the main reactor.

Figure 6:
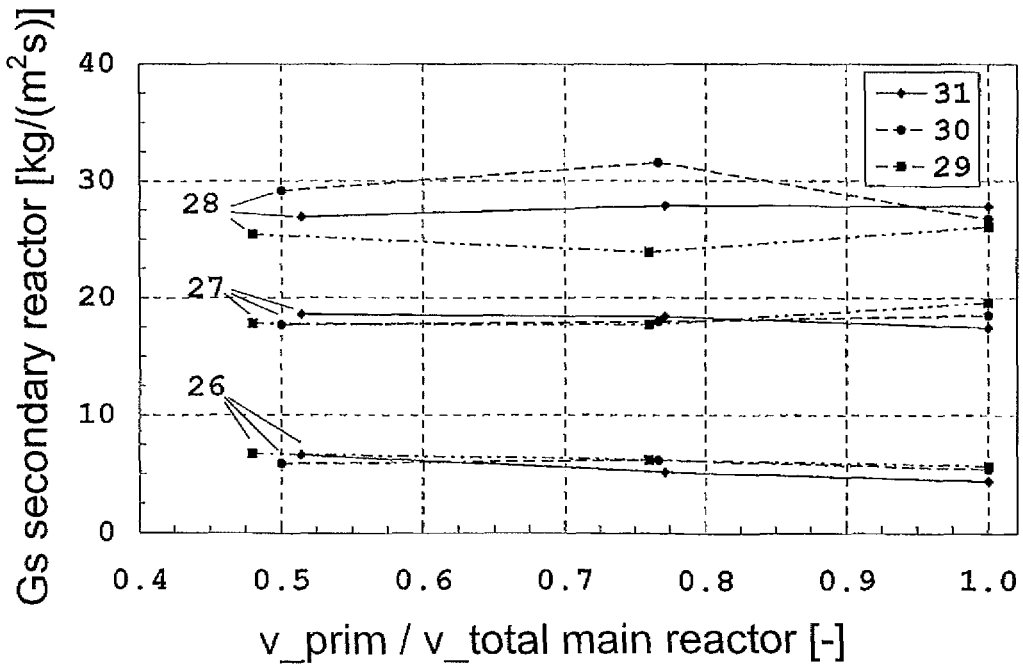

FIG. 6 shows the specific particle transport rate (Gs in kg/(m$^2$s)) of the secondary reactor as a function of the distribution of the fluidization medium to the lower (3) and upper (4) fluid inlets of the main reactor of a hydrodynamic model of the fluidized bed system of the present invention as shown in FIG. 2, in which air is used as fluidization medium. The parameters shown in the diagram include different overall amounts of fluidization medium flowing into the main reactor (25 Nm$^3$/h (29), 30 Nm$^3$/h (30), and 35 Nm$^3$/h (31)), on the one hand, and different amounts of fluidization medium flowing into the secondary reactor (10 Nm$^3$/h (26), 15 Nm$^3$/h (27), and 20 Nm$^3$/h (28)). In this specific case, the secondary reactor is only fluidized via the lower fluid inlet (5). It is shown that the particle transport in the secondary reactor does not significantly depend on the distribution of the fluidization medium to the lower (3) and the upper (4) fluid inlets of the main reactor.

The overall amount of fluidization medium flowing into the main reactor does not have a significant influence on the solid particle transport in the secondary reactor, either. As expected, the overall amount of fluidization medium flowing in the secondary reactor directly affects the solid particle transport into the secondary reactor. An increase of the overall amount of fluidization medium flowing into the secondary reactor leads to a significant increase of the solid particle transport in the secondary reactor.

EXAMPLE

In the fluidized bed reactor system according to FIG. 1, the overall particle circulation is controlled by means of a circulating gas-solid particle fluidized bed (1) having, optionally staggered, gas inlets (3, 4) (main reactor). The fluid transports solid particles via a gas-solid separator (12) and, optionally, via a gas sealing element (9) to the second gas-solid particle fluidized bed (secondary reactor) (2). The solid is recycled via a siphon connection (10) or similar connecting elements (such as a fluidized slide) in the bottom part of the reactors. In individual cases, mostly in small-scale plants, the reactors may be connected to each other via a siphon at their lowest points (FIG. 2). In the secondary reactor (2), the solid is fluidized using a gaseous medium which may also be introduced in a staggered fashion (5, 6). The solid discharged from the secondary reactor is separated from the gas by a gas-solid separator (13) and recycled into the same reactor. The solid circulation in the secondary reactor system may be changed by means of a staggered introduction of gas (5, 6). If the reactors are connected in this way, the solid transport between the two reactors strongly depends on the operation of the main reactor (staggered introduction of the transport medium), but is, at the same time, largely independent of the gas rate and, thus, of the gas dwelling time in the secondary reactor (2). Due to the direct hydraulic connection of the two reactors via the lower siphon (10), the system always strives to balance the filling levels in the two reactors, thereby determining the location of the solid within the system. By applying a pressure difference between the two reaction zones (for example by means of a throttling device at the gas outlet of the particle separator of the respective fluidized bed reactor or by measures which are disposed further downstream in the respective gas stream such as a throttle valve, a flap, or a suction draught), the dwelling time of the solid may be additionally affected. According to the laws of hydrostatics, an increase of the gas pressure in one of the two reactors leads to a change of the imaginary particle filling level in the other reactor. The imaginary particle filling level of a circulating fluidized bed reactor affects the amount of particles discharged from said reactor. In case of the main reactor, the imaginary particle filling level affects the overall particle circulation from the main reactor to the secondary reactor. The overall particle circulation from the main reactor to the secondary reactor is also affected by a change of the flow resistance in the fluidized connecting line in which the particles are transported from the secondary reactor back to the main reactor. During operation, the flow resistance in the connecting line may, for example, be changed by changing the fluidization in the area of the connection or by means of mechanical devices (such as sliders or flaps). An increased flow resistance in the connecting line leads to a reduced overall particle circulation from the main reactor to the secondary reactor. In the area of the solid outlet and the particle separator (13), the secondary reactor is designed so as to provide for a low amount of particles being discharged from the reactor, while the particle concentration at the upper reactor end is still high. This may, for example, be achieved by elevating the reactor above the gas outlet and by means of an appropriate geometry of the gas outlet.

When using more than two reactors, a basic connection scheme according to FIG. 1 may be used, in which case the further reactors may be disposed according to the following options or according to combinations of these options:

1. In the area or instead of the upper siphon (9, FIG. 1) and via an intermediate reactor, which may, for example, be designed to be a stationary fluidized bed and in which, for example, a heat exchanger (FIG. 3) may be provided, the particle stream is transported back to the secondary reactor (2) shown in FIG. 1. Using an appropriate device for dividing the particle stream, such an additional intermediate reactor may only use part of the circulating particle stream. Analogously, such an additional fluidized bed reactor may also be mounted in the particle return loop of the secondary reactor which recycles the particles into the secondary reactor or in the fluidized connecting line from the secondary reactor to the main reactor.

2. The system may comprise an additional secondary reactor (23) which communicates with the two reactors shown in FIG. 1 via a fluidized connection. Using an appropriate device for dividing the particle stream (FIG. 4), the circulation particle stream from the main reactor may be introduced into both secondary reactors. Alternatively, the particle stream which is discharged from the secondary reactor shown in FIG. 1 and separated from the fluid stream may be carried into the additional secondary reactor.

3. As to the particle return loop of an additional secondary reactor, a further variation is possible, whereby the particle stream from said additional secondary reactor may be recycled either to the main reactor or the secondary reactor, both shown in FIG. 1.

The invention claimed is:

1. A fluidized bed reactor system consisting of at least two fluidized bed reactors, comprising at least one main reactor in the form of a circulating fluidized bed and a secondary reactor in the form of a circulating fluidized bed, a particle line which comprises a particle separator and serves to transport fluidized bed particles from the main reactor into the secondary reactor, wherein the secondary reactor comprises a particle return loop which recycles the particles of the fluidized bed of the secondary reactor into any fluidized bed reactor or, when an appropriate device for dividing the particle stream is present, into different fluidized bed reactors, wherein an additional line for transporting fluidized bed particles connects the secondary reactor with the main reactor in the lower halves of these reactors.

2. The system according to claim 1, wherein the particle line which comprises a particle separator and serves to transport fluidized bed particles from the main reactor into the secondary reactor recycles part of the particle stream directly into the main reactor, using an appropriate device for dividing the particle stream.

3. The system according to claim 1, wherein the additional line for transporting fluidized bed particles connects the bottom of the secondary reactor with the bottom of the main reactor.

4. The system according to claim 1, wherein the main reactor and/or the secondary reactor comprise(s) several fluid inlets, which are disposed in tiers in several planes along the height of the reactors.

5. The system according to claim 1, wherein the particle return loop of the secondary reactor enters into the secondary reactor below the inlet of the particle line for transporting fluidized bed particles from the main reactor into the secondary reactor.

6. The system according to claim 1, wherein the particle return loop of the secondary reactor comprises a particle separator.

7. The system according to claim 1, wherein the particle line for transporting fluidized bed particles from the main reactor into the secondary reactor enters into the secondary reactor above the additional line for transporting fluidized bed particles from the secondary reactor into the main reactor.

8. The system according to claim 1, wherein the additional line for transporting fluidized bed particles from the secondary reactor into the main reactor enters into the main reactor at or above the lowest fluid inlet, wherein the fluidization of the additional line may optionally replace the lowest fluid inlet.

9. The system according to claim 1, wherein the additional line for transporting fluidized bed particles from the secondary reactor into the main reactor comprises a gas sealing element.

10. The system according to claim 1, wherein the additional line for transporting fluidized bed particles from the secondary reactor into the main reactor comprises an inert gas particle fluidizing means.

11. The system according to claim 1, wherein the particle line of the main reactor and/or the particle return loop of the secondary reactor; comprise(s) a gas sealing element.

12. The system according to claim 1, wherein the particle line of the main reactor and/or the particle return loop of the secondary reactor comprise(s) an inert gas particle fluidizing means.

13. The system according to claim 1, wherein the system comprises a further secondary reactor, wherein either a particle line from at least one secondary reactor leads into said further secondary reactor, or the particle line from the main reactor to the secondary reactor leads at least partially into said further secondary reactor.

14. The system according to claim 13, wherein the particle return loop of the secondary reactor or the particle line from the main reactor to the secondary reactor comprises a particle stream divider.

15. The system according to claim 1, wherein the particle return loop of the secondary reactor comprises a heat exchanger.

16. The system according to claim 10 or claim 12, wherein the fluidizing means is a water vapor particle fluidizing means.

17. The system according to claim 9 or claim 11, wherein the gas sealing element is a siphon.

18. The system according to claim 1, wherein the additional line for transporting fluidized bed particles connects the secondary reactor with the main reactor in the lower thirds or quarters of these reactors.

* * * * *